Sept. 2, 1947.  G. AUER  2,426,808

SAFETY VALVE

Filed Dec. 14, 1943  2 Sheets-Sheet 1

INVENTOR
Gustavus Auer
BY
Beau, Brooks, Buckley & Beau.
ATTORNEYS

Sept. 2, 1947.  G. AUER  2,426,808
SAFETY VALVE
Filed Dec. 14, 1943  2 Sheets-Sheet 2

INVENTOR
Gustavus Auer
BY
Beau, Brooks, Buckley & Beau
ATTORNEYS

Patented Sept. 2, 1947

2,426,808

UNITED STATES PATENT OFFICE 2,426,808

SAFETY VALVE

Gustavus Auer, Upper Montclair, N. J.

Application December 14, 1943, Serial No. 514,229

3 Claims. (Cl. 220—89)

This invention relates to safety valves and particularly to novel safety valve means affording a superior degree of accuracy of control.

It is one object of the present invention to provide safety valve structure wherein the valve is sensitive not only to fluid pressure but to temperatures. The temperatures to which the valve means responds may be the temperature of the fluid whose pressure is being limited by the safety valve or it may be the temperature of the ambient air. The point at which the valve will relieve fluid pressure will accordingly be seen to be a combined function of pressure and temperature.

Another object of the present invention is to provide a shear-pin safety valve wherein the effective shear pin area may be accurately controlled and adjusted. This object of the invention is attained in a structure which is simple and economical in construction and which permits ready and accurate selective adjustment throughout a relatively wide range.

Safety valves currently in use are inadequate in many cases, particularly where rather rapid pressure increases are apt to develop due to the presence of external fires. The present invention provides, as the element which is ruptured in response to undue increase in pressure, a fusible element whose resistance to external stress decreases materially within suitable practical ranges upon increase of temperature. One illustrative practical application of this novel principle may be in connection with a fractionating column in an oil refinery distillation or cracking operation. By way of example, let us assume a tower ten feet in diameter and one hundred feet high, operating at 600° F. and 250 pounds per square inch pressure. In the event of a fire, the operators might be unable to gain access to the equipment and, in the instance mentioned, one or more six inch relief valves constructed according to the present invention would protect the system in the emergency stated, being connected to discharge into remote "blow-down" or flare stacks. The details of a fusible and frangible element suitable in the particular instance here referred to will be given hereinafter.

Several embodiments of the principles of the present invention are illustrated in the drawings and described in detail hereinafter but it is to be understood that they are set forth merely by way of example and that the principles of the invention are not limited other than as defined in the appended claims.

Figure 1:
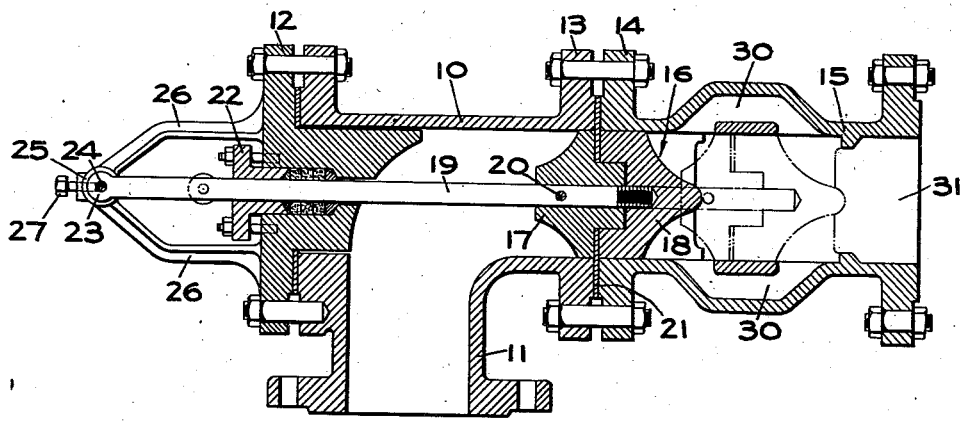
Fig. 1 is a longitudinal cross sectional view of one form of the safety valve of my invention.

Throughout the several figures of the drawing, like characters of reference denote like parts and in Fig. 1, the numeral 10 designates a substantially cylindrical valve body having an inlet extension 11 formed therewith. A head 12 bolted to body 10 closes one end thereof and the other end has a flange 13 for connection with a companion flange 14 of an extension 15 of the valve body.

A valve element is designated generally 16 in Fig. 1 and comprises parts 17 and 18 which are held assembled by means of a valve stem 19. The stem 19 is pinned to the part 17 as at 20 and the part 18 is screw threaded to the end of stem 19 to clamp against part 18. A frangible disc 21 is clamped between the parts 18 and 19 of valve 17 and likewise between the flanges 13 and 14 of the valve body 10 and extension 15. The disc 21 is merely a sealing disc and may be of negligible structural strength since it has an insignificant area exposed to the fluid pressure in the valve body 10.

The valve stem 19 passes through a conventional stuffing box 22 provided in head 12 and terminates in an eye formation 23 which receives a shear pin 24. As appears from Figs. 1 and 2, the shear pin 24 is supported, at opposite sides of eye 23, in bearings 25 which have suitable supporting brackets 26, extending to the head 12 of the valve body. The shear pin 24 is held against accidental disassembly by a set screw 27.

When the pressure in valve body 10 against the valve 16 exceeds twice the shearing strength of pin 24 (the pin being in double shear), the pin ruptures and valve 16 is free to move to the dot and dash line position of Fig. 1, in which by-pass passages 30 formed in extension 15 establish fluid communication between the interior of valve body 10 and a discharge passage 31.

As previously indicated, the shearing strength of pin 24 is calculated to vary with its temperature throughout predetermined working ranges and to this end suitable alloys are selected, according to the desired range and rate of variation. Referring again to the fractionating tower suggested previously herein, a six inch valve at a maximum safe operating pressure of 300 pounds per square inch under normal temperature conditions would, deducting for the area of the valve stem, exert a force 8400 pounds on the shear pin. An alloy of 70% lead, 10% tin and 20% bismuth would be suitable since it has a fusion temperature of 450° F. and it provides an alloy of sufficient strength under normal conditions. The lead-tin-bismuth alloy described above has a tensile strength of about 10,000 pounds per square inch and a shearing strength of about 7,500 pounds per square inch. A pin 0.84 inch in diameter would accordingly be proper under the conditions named.

A further example is found in the use of an aluminum shear pin. Aluminum loses strength rapidly on increase in temperature and its shearing strength at 500° F. is about 37% of what it is at atmospheric temperature. The selection of a suitable metal or combination of metals is to be made according to requirements in service. The average estimated temperatures in tests of fractionating installations like the one mentioned above are from 1000° to 1400° F. Proper materials may be determined empirically and the required shear pin area may then be accurately calculated. Also, theoretical calculations may be employed in determining both the material and the shear pin area in the first instance, with tests under actual conditions to verify the calculations.

Figure 3:
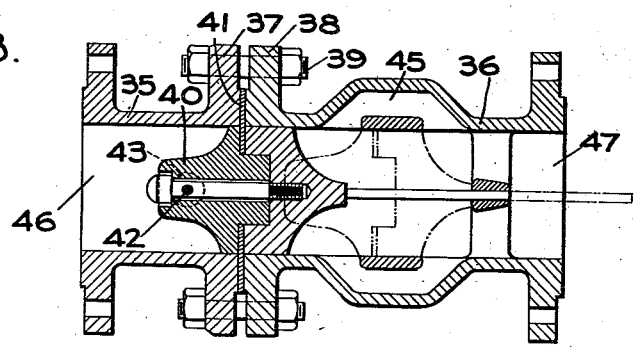
Fig. 3 is a view similar to Fig. 1 showing another form of the safety valve of my invention.

Fig. 3 illustrates a form of the safety valve of the present invention wherein the shear pin is disposed within the conduit and is accordingly subjected to the temperature conditions of the fluid. In Fig. 3 companion generally cylindrical valve housing elements are designated 35 and 36 and they have annular flanges 37 and 38, respectively, for securement to each other by means of studs 39. A valve designated generally 40 comprises two elements like those of Fig. 1 and similarly includes a frangible sealing disc 41. In Fig. 3 the shear pin is designated 42 and extends through the valve 40 and into the housing element 35 at opposite sides of the valve. To provide sharp shearing planes both the valve 40 and the inner walls of the housing 35 may be provided with bosses 43 concentric with pin 42.

Figure 2:
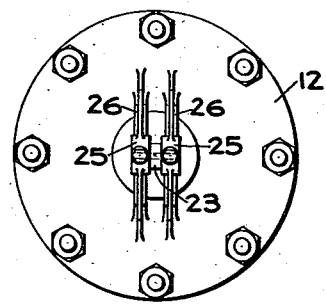
Fig. 2 is an end elevational view of the valve of Fig. 1.

Other than the interior disposition of the shear pin 42, the operation of the valve of Fig. 3 is the same as that of Figs. 1 and 2. The dot and dash lines indicate the position of valve 40 after rupture of shear pin 42 and the by-pass passages of valve housing element 36 are designated 45. The inlet passage of the valve of Fig. 3 is designated 46 and the discharge passage 47.

Figure 4:
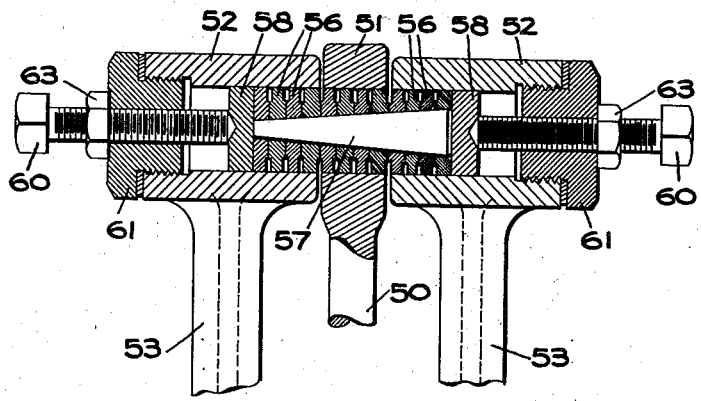
Fig. 4 is a fragmentary cross sectional view showing a novel adjustable shear pin arrangement.
Figure 5:
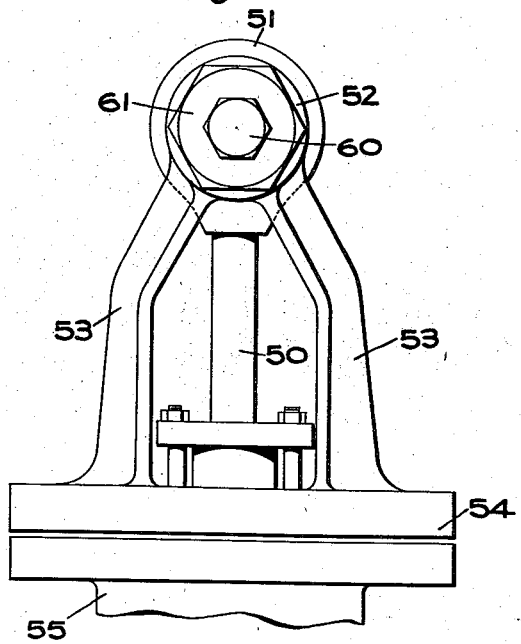
Fig. 5 is an elevational view taken at right angles to Fig. 4.

Figs. 4 and 5 illustrate a novel shear pin arrangement wherein the effective shear areas may be selectively varied throughout a considerable range and in a very simple manner. The portion of the valve not illustrated in Figs. 4 and 5 may be the same as that illustrated in Figs. 1 and 2. In Figs. 4 and 5, 50 designates a valve stem which has an eye 51 disposed between spaced bearings 52 carried by supporting arms 53 rising from a valve casing cover plate 54, the valve body being designated 55 in Fig. 5.

As shown in detail in Fig. 4, the eye 51 and the bearings 52 are bored to receive a series of collars or washers 56 and the washers 56 receive a tapered shear pin 57. The assembly comprising washers 56 and shear pin 57 is confined between discs 58 and the discs 58 are adapted to be adjusted axially of the eye and the bearings by adjustment of a pair of screws 60 threaded into end members 61 which are assembled rigidly with the bearings 52 as by threading thereinto. The adjusted positions of screws 60 are maintained by means of lock nuts 63.

It will be clear from the foregoing that the shear areas of the shear pin 57, as the parts are illustrated in Fig. 4, will be on planes between the fourth and fifth washer from the left of Fig. 4 and between the eighth and ninth washer from the left. It will also be clear that axial adjustment of the entire assembly within the bearings 52 and eye 51 may be effected to either increase or decrease the total shear area by placing the planes between other pairs of washers in the spaces between eye 51 and the bearings 52. The washers 56 are peripherally relieved as shown in Fig. 4 to avoid the necessity for extreme accuracy in the adjustment of screws 60 and to insure full shearing load on the desired transverse planes through shear pin 57.

What is claimed is:

1. In a safety valve device, a casing having a valve element, adjustable shear pin means associated with said casing and comprising a series of coaxial collars, a tapered opening extending axially through the series of collars, a tapered shear pin disposed in said opening, a pair of members movable with respect to each other in a direction normal to the common axis of said collars by movement of said valve element, and adjusting means for moving said collars and said pin axially as a unit to dispose the plane between any pair of adjacent collars in the plane between said movable members whereby to adjust the effective shearing diameter of the tapered shear pin.

2. In a safety valve device, a casing having a valve element, adjustable shear pin means associated with said casing and comprising a series of coaxial collars, said series of collars having an opening varying in diameter extending axially therethrough, a shear pin varying in diameter similarly to said opening and disposed therein, a pair of members movable with respect to each other in a direction normal to the common axis of said collars by movement of said valve element, and adjusting means for moving said collars and said pin axially as a unit to dispose the plane between any pair of adjacent collars in a plane between said movable members whereby to adjust the effective shearing diameter of the shear pin.

3. In a safety valve device, a valve casing having a valve element and adjustable shear pin means comprising a clevis element and an eye member disposed coaxially therein and constructed and arranged to provide shearing edges therebetween, one of said elements being anchored to the casing and the other being connected to said valve to be moved thereby at right angles to the axis of the clevis and eye, a series of coaxial collars axially arranged in said clevis and eye, said series of collars having a tapered opening extending axially therethrough, a tapered shear pin disposed in said opening, and adjusting means for moving said collars and said pin axially as a unit to disposed planes between various pairs of adjacent collars in the planes of said shearing edges between the clevis and eye whereby to adjust the effective shearing diameters of the tapered shear pin.

GUSTAVUS AUER.

(References on following page)

REFERENCES CITED

The following references are of record in the file of this patent:

UNITED STATES PATENTS

| Number | Name | Date |
|---|---|---|
| 2,071,375 | Allen | Feb. 23, 1937 |
| 2,291,374 | Canfield | July 28, 1942 |
| 589,944 | Greengrass | Sept. 14, 1897 |
| 869,000 | Letteri | Oct. 22, 1907 |
| 1,734,186 | Weidmann | Nov. 5, 1929 |
| 2,062,381 | Tryon et al. | Dec. 1, 1936 |
| 1,697,199 | McKenzie-Martyn | Jan. 1, 1929 |
| 2,098,399 | Munson | Nov. 9, 1937 |
| 2,166,277 | Adams | July 18, 1939 |
| 2,357,620 | Thomas | Sept. 5, 1944 |
| 900,763 | McNutt | Oct. 13, 1908 |
| 1,444,661 | Clifford | Feb. 6, 1923 |

FOREIGN PATENTS

| Number | Country | Date |
|---|---|---|
| 774,538 | France | Sept. 24, 1934 |